A. PHILIP & L. J. STEELE.
DETECTOR OF COMBUSTIBLE GASES.
APPLICATION FILED NOV. 26, 1912.
1,224,321.
Patented May 1, 1917.
6 SHEETS—SHEET 3.
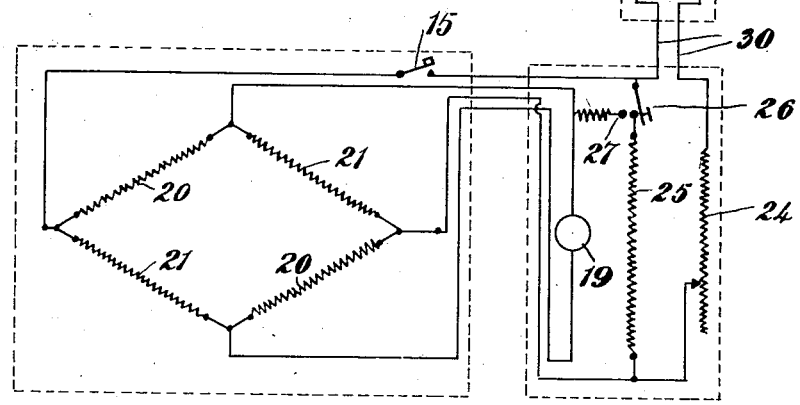
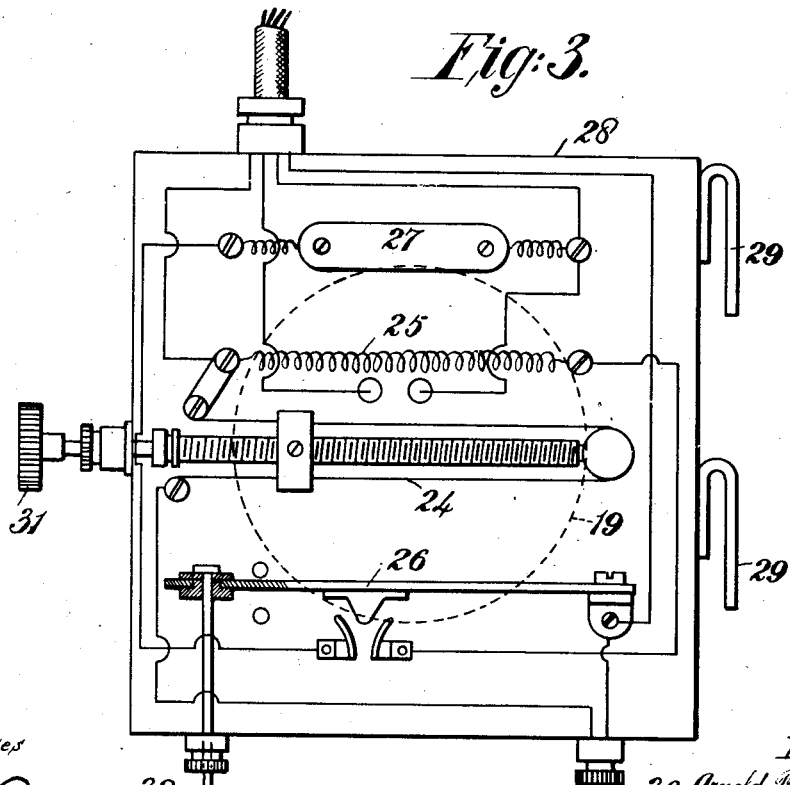

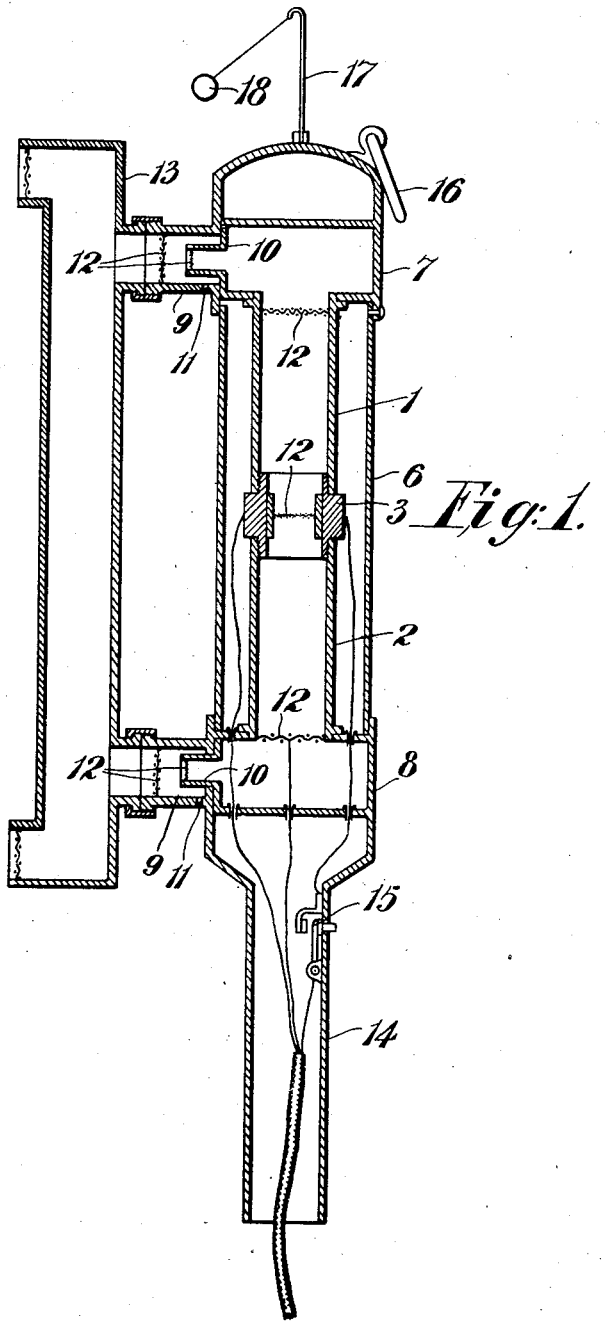

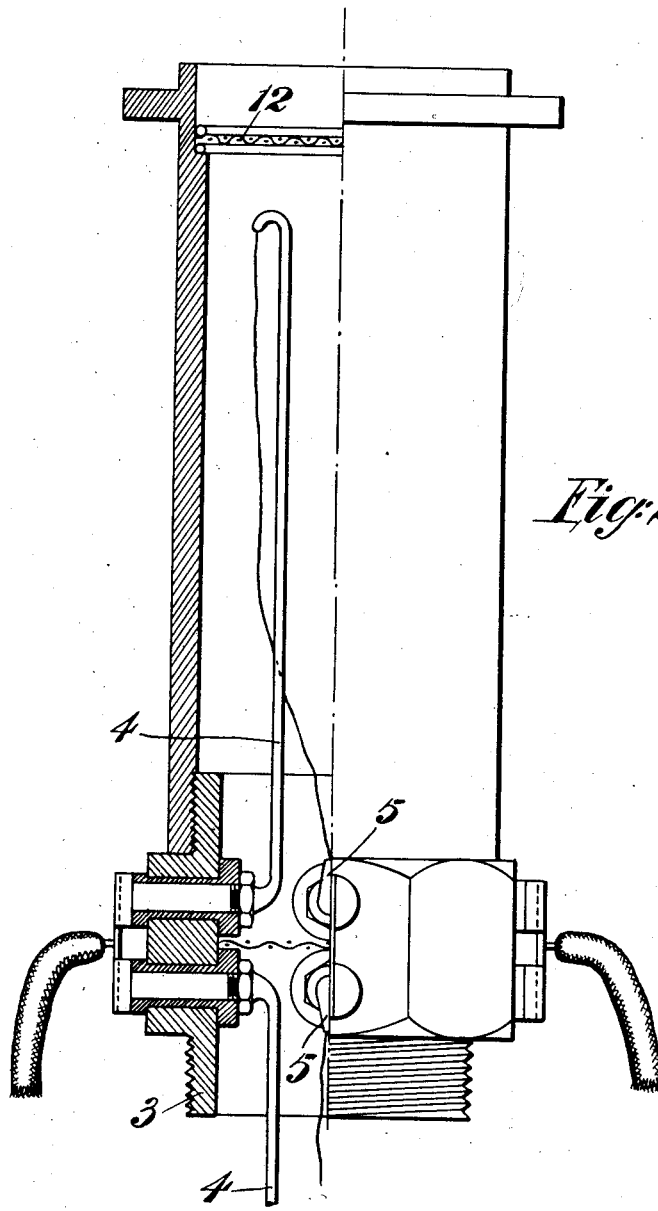

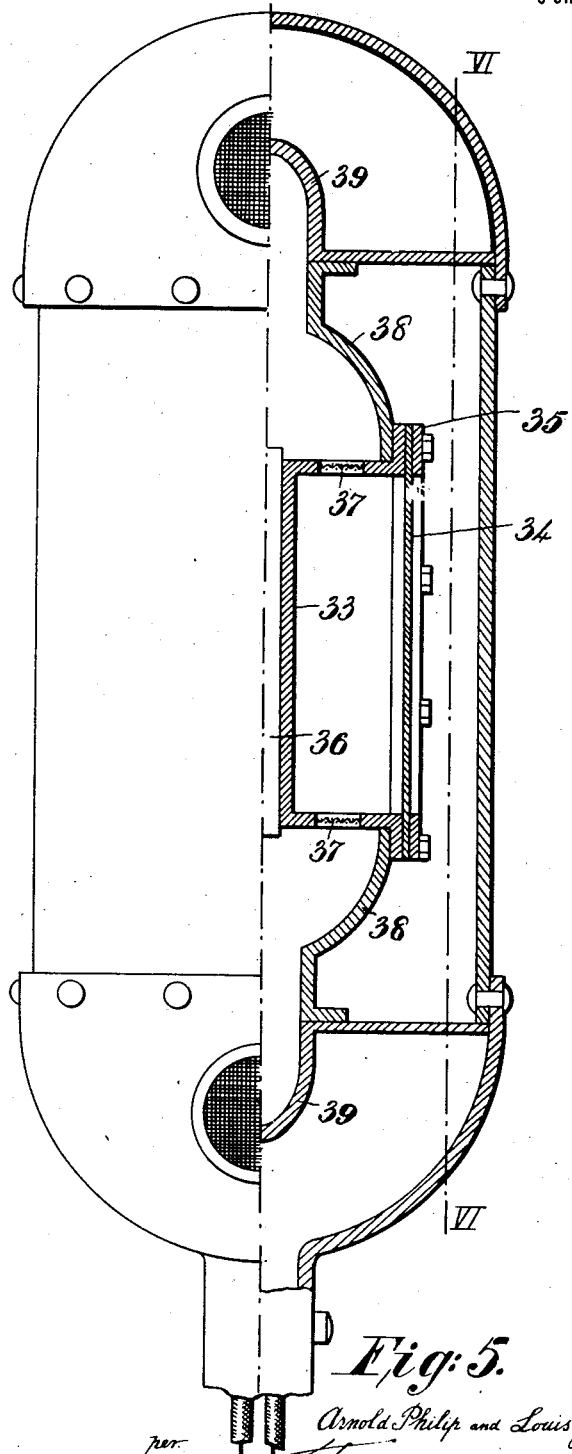

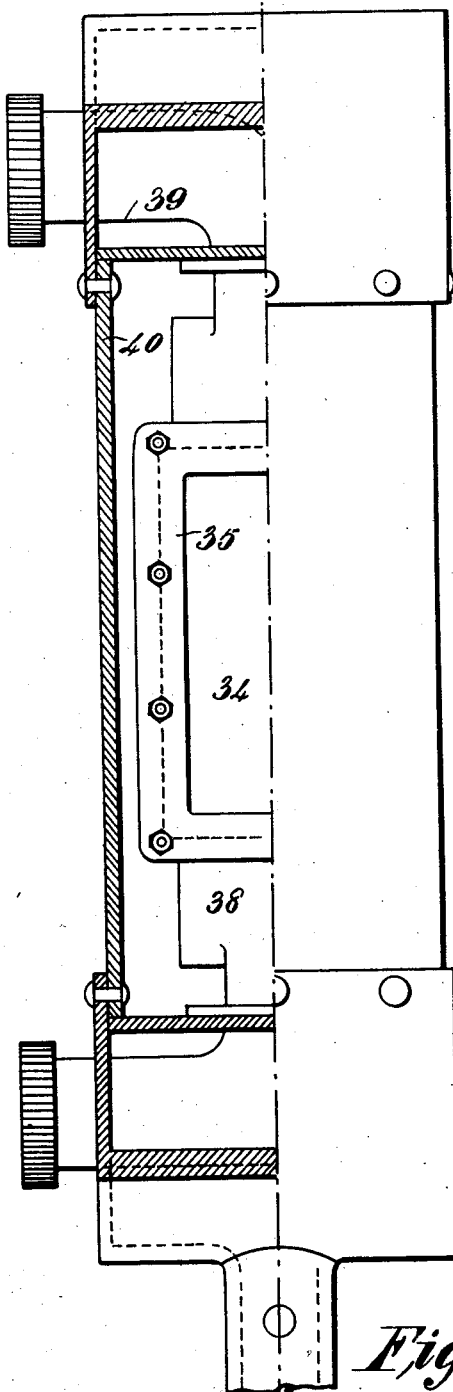

A. PHILIP & L. J. STEELE.
DETECTOR OF COMBUSTIBLE GASES.
APPLICATION FILED NOV. 26, 1912.

1,224,321.

Patented May 1, 1917.
6 SHEETS—SHEET 6.

UNITED STATES PATENT OFFICE.

ARNOLD PHILIP AND LOUIS J. STEELE, OF PORTSMOUTH, ENGLAND.

DETECTOR OF COMBUSTIBLE GASES.

1,224,321. Specification of Letters Patent. Patented May 1, 1917.

Application filed November 26, 1912. Serial No. 733,719.

*To all whom it may concern:*

Be it known that we, ARNOLD PHILIP, B. Sc., chemist, and LOUIS JOHN STEELE, M. I. E. E., electrical engineer, both residing at His Majesty's dockyard, Portsmouth, Hampshire, England, have invented new and useful Improvements in Detectors of Combustible Gases, of which the following is a specification.

This invention relates to apparatus dependent upon catalytic action for the detection of combustible gases. The purpose of the invention is in the first place to produce a portable apparatus of this class such as may conveniently be carried about in a coal mine for making tests periodically at different places. A further purpose of the invention, pursued for its own sake though also necessary to the attainment of the above, is to make such apparatus highly sensitive. And in order that such sensitiveness may be of practical value the invention further designs to remove the causes of error which arise in the apparatus itself, or from the situation in which it is used. It is also a purpose of the invention to meet the need of portability, in taking advantage of the special sensitiveness secured, by using the battery of an ordinary electric miner's lamp as the source of power for the catalytic apparatus, and to so design the apparatus that it may conveniently be carried and used by a person carrying a miner's lamp.

The essential part of the conductor consists as in earlier known portable apparatus devised by us and others of a catalytic substance such as platinum or other catalytic metal which is maintained in sensitive condition and causes combustion upon its surface of any combustible gases which may be present in the atmosphere supplied to it; the rise of temperature resulting from this catalytic combustion can be detected in various known ways. Generally the catalytic substance is used in the form of a wire which is heated by the passage of current through it, and the active wire is combined with another, for instance of carbon, which is not catalytically active; and the difference between the resistance of the two wires as measured by some form of galvanometer shows the action proceeding on the surface of one of them, and so indirectly the percentage of combustible gas present. For the purpose of comparing the resistance of the wires they may be arranged in the form of a Wheatstone bridge, or alternatively each wire may be in series or in parallel with one winding of a differential galvanometer.

If the Wheatstone bridge arrangement is employed a certain additional sensitiveness may be secured by the use of two catalytically active and two inactive wires arranged alternately in the bridge.

In any of these arrangements, however, the indicating instrument may show deflections which are not due to the presence of combustible matter. Taking the Wheatstone bridge as an example it will readily be seen that if the arms are balanced for a particular heating current passing through the bridge they will not in general be balanced for any other current; so that a decrease in temperature of both wires due to a falling off of the battery E. M. F. will cause unequal changes in the resistance and hence produce a deflection. In so far as deflections are due to differences in the temperature coefficients of the materials of the two balanced wires, they can be avoided by the employment of two wires of practically the same temperature coefficient through the range through which they are respectively used. Seeing, however, that one wire must be catalytic the choice of simple materials is somewhat limited. But it is quite possible to use two wires of the same or of different catalytic materials, and to render one inactive either by coating its surface or by maintaining it at a temperature below that at which its catalytic activity is manifested. For instance a wire of platinum or paladium may have a coating of gold or other metal deposited upon it electrolytically; or it might be enameled or dipped in a fused salt or aqueous solution; or its surface might otherwise be treated with chemicals, as for instance sulfur, so as to produce an inactive surface layer. If the one wire is to be maintained at a low temperature so as to exert no catalytic action it may be made of greater cross section and of correspondingly greater length or of greater surface so as to be more considerably cooled.

Neither of these methods will deal completely with changes arising from variation in the battery E. M. F. For even if two wires had the same temperature coefficient at the temperatures at which they are respectively worked, their emissivities and areas of their radiating surfaces will not in general be the same, and therefore a given change in E. M. F. applied to each will not in general produce the same percentage change of resistance in each. But by a suitable choice of materials, taking into account their coefficients of resistance, their temperature coefficients, their emissivities, and the areas of their radiating surfaces, it is possible to arrange two wires so that over a given range of voltage the function connecting the resistance with the current through the wire is very nearly the same for both. The range of choice may be widened as above indicated, by coating active materials to make them inactive, or by coating any materials to vary their emissivity; and the catalytic agent may be a coating upon a wire itself inactive. It has been found that a pair of wires fulfilling these conditions as nearly as is necessary for practical purposes, can be formed from platinum and palladium, the platinum being kept at a temperature at which it is inactive, while the palladium, which is active at a lower temperature than platinum, serves as the catalytic agent. It is in fact rather important for the purpose of the invention to make use of palladium as the active material because the fact that it is active at a lower temperature than platinum enables it to be brought to the active temperature by a less expenditure of energy. The gas which forms the main combustible in coal mines, namely marsh gas, is comparatively inert, and therefore a given catalytic material needs to be run at a higher temperature than would be necessary for detecting hydrogen or like more active gas. With the small amount of energy available in such batteries as are used with miners' lamps it is more difficult, without interfering with the supply of the lamp, to obtain sufficient current to enable a platinum detector to be used.

The catalytic wires may with advantage be manufactured in such a way as to present an exceptionally large surface. For this purpose the methods adopted for the production of metal filaments for incandescent lamps may be employed. For example an alloy of a catalytic metal and of a more readily vaporizable metal may be drawn into wire, and then heated preferably *in vacuo* to eliminate the volatile metal; the alloyed metal may also be removed chemically. Or the catalytic metal may be finely divided and made into a paste with an organic binding material, which is afterward carbonized and the carbon removed if necessary in known manner.

Other features of construction by which the difficulties above referred to are avoided or overcome may be more readily described by reference to the accompanying drawings in which—

Figure 1 is a vertical section, partly diagrammatic, of one form of detector.

Fig. 2 is a detail showing the mounting of the wires in this form of detector partly in section and partly in elevation.

Fig. 3 is a diagrammatic representation of the interior of the indicator, part of the apparatus showing means for adjustment.

Fig. 4 is a diagram of the electric connections of this construction.

Fig. 5 is an elevation partly in section of an alternative construction of detector.

Fig. 6 is a side elevation of the same partly in section on the line VI—VI of Fig. 5.

Figure 7:
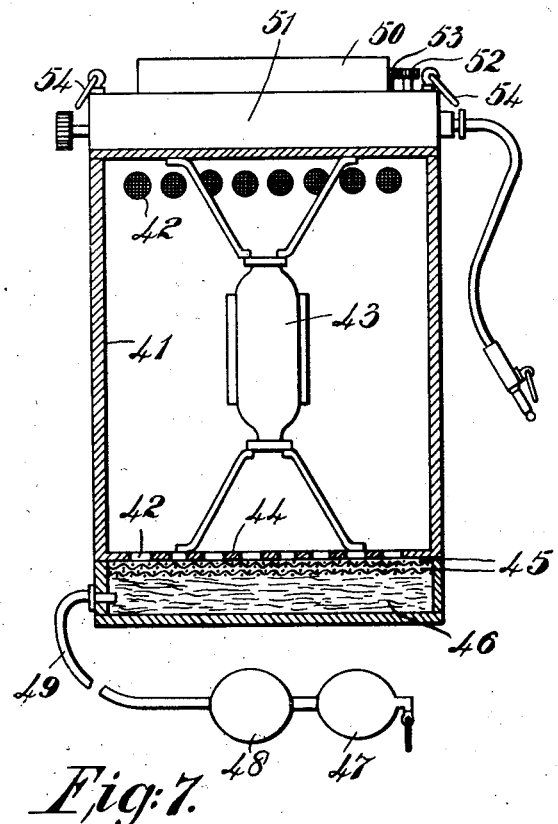
Fig. 7 shows a further form of detector and indicator combined, partly in elevation and partly in section.

In the arrangement shown in Figs. 1 and 2, the four wires of a Wheatstone bridge, arranged as above suggested with alternate active and inactive wires, are mounted in pairs in tubes through which the atmosphere to be tested can be caused to pass as a natural draft arising from the heating of the wires. The two catalytically active wires are preferably in the upper tube 1 and the inactive wires in the lower tube 2, these tubes being screwed to a central or junction section or mounting 3 upon which the supports 4, 5 of the wires are fastened. As will be seen from Fig. 2 the supports 4, 5 are insulated from the junction section 3, the outer ends of the supports being electrically connected and joined to insulated wires which pass downward outside the tube 2. For the sake of mechanical protection and for protection from drafts the wire mountings and their protective tubes 1 and 2 are inclosed in an outer casing 6 which is provided with caps 7 and 8. These make joint with the tubes 1 and 2 respectively and open through lateral tubulures 9. The actual air channel in these tubulures is formed by tubes 10, the purpose of these being to prevent ingress of moisture into the interior of the apparatus. Any moisture which enters the tubulures 9 will fall to the bottom and drain out through the openings 11 outside the casing.

Sheets of wire gauze 12 at the ends of the tubes 1 and 2 and at the openings of the tubes 9 and 10 serve to remove all possibility of the gases outside the instrument being ignited as the result of combustion within; the sheets of gauze may conveniently be held in place by spring rings as indicated in the upper part of Fig. 2. It is necessary that the inlet and outlet tubes 9 should both face in the same direction as otherwise variations in the draft in the main would cause very great variations of temperature within the casing and would lead to oscillations of the indicating needle thus preventing accurate reading being obtained. It is in fact preferable, for the sake of security against the effects of drafts, to attach to the tubes 9 a separate member 13 which makes joint with the two tubes and has itself an outlet and an inlet at a different level from the tubes 9. The said inlet and outlet are also preferably covered with wire gauze.

The lower cap 8 of the instrument is prolonged into a tubular handle 14; one of the insulating wires connected with the supports 4, 5 is passed through the switch 15 in this handle which can be closed by pressure on a button and opens automatically when the pressure is removed. The upper cap 7 has a ring 16 by which the instrument may be hung upon a hook on the user's coat. There may also be provided on this upper cap a standard 17 supporting a pith or celluloid ball 18 or other form of wind vane which will serve to indicate the direction of the draft.

In this construction of instrument the indicator shown diagrammatically in Fig. 3 is formed separately from the detector above described, the two being connected only by flexible conductors. In the form illustrated the detector comprises a galvanometer or milliammeter 19 (Figs. 3 and 4) which is connected across the Wheatstone bridge formed of two catalytic wires 20 and two non-catalytic wires (i. e. wires not catalytically active) 21. As may be seen from the diagram of Fig. 4 current is supplied to the Wheatstone bridge through the switch 15 from one or more cells of the battery 22 which supplies the miner's lamp 23. As this battery varies in voltage it is necessary to provide some means for bringing the instrument into some standard condition in which its indications will have a definite significance. This is best done by providing means for regulating the voltage so that a voltage of given or standard value may always be applied to the Wheatstone bridge when a definite working current is flowing through it. The magnitude of this current depends obviously on the nature of the wires and must be such as will maintain the catalytic wires in active condition. To control the voltage a variable resistance 24 is provided in series with the battery. It is then necessary to provide means to show when the apparatus is adjusted to the standard condition. It is not convenient for this purpose to pass current actually through the Wheatstone bridge as it may be necessary to make the adjustment in some place where combustible gas is present and this would render the adjustment incorrect. A resistance 25 is therefore provided which can be put across the battery by the aid of the switch 26. This resistance is adjusted to represent the resistance of the bridge, and in order to indicate the current flowing the switch 26 is caused to connect the galvanometer 19 across the resistance. A further resistance 27 is inserted in this galvanometer circuit, and this has previously been adjusted so that the condition for standard voltage is represented by a deflection of fair magnitude on the galvanometer. It will be seen that the circuit includes one arm 20 of the bridge as well as the resistance 27, while one arm 21 is in parallel across the galvanometer and arm 20, and the galvanometer alone is further shunted by the remaining arms 20, 21. Because of the presence of resistance 27 the currents in all the arms of the bridge during adjustment for standard current are reduced to small values such as the galvanometer is fitted to receive, which are far below what is necessary to heat the wires to active condition.

The resistances 24, 25, 27 with the switch 26 are disposed in a casing 28, as shown diagrammatically in Fig. 3, to the front of which the galvanometer 19 is attached. This casing is provided with hooks or hinges 29 which fit in sockets provided on the casing of the lamp 22, 23. This is in general form an ordinary miner's lamp, but besides the hinge sockets for the adjustment of the casing 28 it has an electric contact socket after the pattern of a telephone jack, the contacts of which are joined to the terminals of its battery or to the terminals of one or more cells of the battery. A plug similar in pattern to the ordinary telephone contact plug is connected with the resistance 24 and switch 26 by a flexible lead 30 which is of appropriate length to enable the plug to be inserted in the socket of the lamp when the casing is attached thereto by means of the hinges 29. As appears from the figure the resistance 24 is adjustable by means of a milled head 31. The switch 26 is operated by pulling on the hook 32, and can conveniently be kept closed for the purposes of adjustment by hanging the ring 16 of the detector shown in Fig. 1 upon the hook.

The dotted lines in Fig. 4 serve to indicate the extent of each of the three mechanically separate parts of which a complete apparatus is made up. These are, (1)

the ordinary miner's lamp and battery, now provided with a contact socket and hinges, (2) the indicator part which includes the galvanometer and the adjusting devices contained in the casing behind it, and (3) the detector which is the protected mounting with the bridge-connected wires.

This form of apparatus is very convenient for carrying, as the flexible conductor joining the detector and indicator may be passed over the shoulders so that the two instruments hang down one on either side and can be sustained in suitable side pockets, or, if desired, can be supported by hooks secured on the coat. The lamp is, of course, carried in the hand.

It is quite common for existing detectors to be built in two portions, one forming the detector proper, and the other an indicator; but, to our knowledge, no portable apparatus has yet been devised which can be carried and used like that now described.

When it is desired to make a test the casing 28 is attached to the lamp both by means of the hinges 29 and by means of the plug and flexible connector 30; the lamp then illuminates the dial of the galvanometer. Then the switch 26 is closed and the milled head 31 is rotated until the standard deflection is obtained upon the galvanometer 10 thus showing that the correct testing voltage is available. The switch 26 is then opened and the switch 15 is closed. After ten or twenty seconds the instrument attains a steady reading indicating the percentage of combustible gas present. Should this percentage be very considerable the circuit through the catalytic wires is readily interrupted by releasing the switch 15, but such interruption may not be sufficient to cause the wires to cool as catalytic action may be violent enough to heat them still further. But in that case the apparatus automatically protects itself in explosive mixtures, for the temperature at which the combustible mixture will ignite is reached before the catalytic wire is fused. When such a condition occurs the gas in the narrow tubes 1 and 2 is rapidly burnt and then the flame continues upon the surface of the lower gauze sheet 12 of the tube containing the active wire or wires. The tube being narrow the flame can occupy the whole surface so that none but burnt gases pass up to the wires, which therefore cool, except in so far as the heat of the flame maintains their temperature.

An alternative construction of the detector is shown in Figs. 5 and 6. In this case the active and inactive wires are mounted not one above the other but side by side. Each pair is mounted in a sheet metal casing 33 which is provided with a flanged edge upon which a flat cover can be fastened. In the form shown the cover consists of a sheet of mica 34 secured in place by a metal ring 35; this allows inspection of the wires. The two casings may be separated by layers of asbestos or like heat insulating material 36 or merely by an air space. They have openings 37 at the bottom and top for the admission and escape of gas.

In this arrangement it is highly important that as much gas shall pass through the one chamber 33 as through the other since any difference in the amount would lead to false readings. To secure this end the chambers are arranged in an outer casing which has an inlet and outlet with respect to which the chambers are precisely symmetrical. As will be seen from the figure the two inlets and the two outlets are united into common channels by domes 38 which both open through tubes 39 on to the same face of the outer protecting casing 40.

Figure 8:
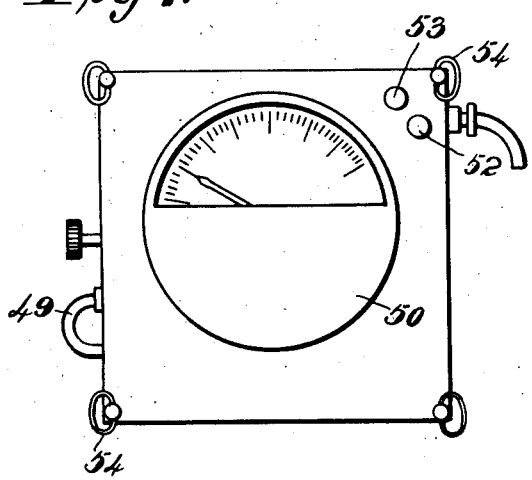
Fig. 8 is a plan of this form.

In both these forms of apparatus the supply of gas to be tested to the catalytic wires is maintained by natural draft; in some respects it is better to so arrange the apparatus that normally the atmosphere surrounding it does not obtain access to it at all but is specially supplied at and during the time the test is being made. The constructions of apparatus shown in Figs. 1 and 2 and in Figs. 5 and 6 can be readily modified to operate in this manner by providing in them further layers of wire gauze or other material which will practically totally obstruct the flow of gas and then attaching to them a small pump by which gas can be forced through. A better construction for this purpose is shown in Figs. 7 and 8. This consists of a casing 41 having perforations 42 at the bottom and top which incloses a mounting 43 containing the catalytic wires. This mounting may, for instance, be constructed according to Figs. 1 and 2 or according to Figs. 5 and 6, the outer casing of these figures being, of course, unnecessary. The lower openings 42 for the admission of gas to the casing may be formed in a false bottom 44 beneath which are arranged several layers 45 of wire gauze and a quantity of asbestos fiber powder or like filtering material 46. The upper holes 42 should be similarly protected. The surrounding atmosphere can be forced into the casing through the asbestos fiber and the wire gauze by means of a small pump which conveniently takes the form of a valved rubber bulb 47. A second bulb 48 may be inserted to keep the flow constant, and if desired a further dust filter additional to the asbestos fiber 46 may be provided in the course of the tube 49.

Upon the top of the casing 41 is mounted the indicating instrument 50 together with the casing 51 containing the means for current adjustment. In the example shown these are supposed to be substantially similar to the construction of Fig. 3 save that no hinges 29 are required and the switch 26 is operated by a press button 52 on the top of the casing. The switch 15 of Fig. 1 is also replaced by a second press button 53. The casing has rings 54 at its corners and is intended to be supported by a strap passed over the shoulders. The plug 55 and the pump 47 have also each a ring so that they may be hung on hooks on the coat out of the way when the instrument is not in use.

What we claim is:

1. In a catalytic detector, the combination of two active and two inactive wires, connections between the active and inactive wires forming them into a Wheatstone bridge in which the active and inactive wires alternate, and an indicating apparatus and source of supply joined to said bridge.

2. In a catalytic detector, the combination of two active and two inactive wires, connections between the active and inactive wires forming them into a Wheatstone bridge in which the active and inactive wires alternate, an indicating apparatus and source of supply joined to said bridge, and means for varying the current supplied to the bridge.

3. In a catalytic detector, the combination of two active and two inactive wires, connections between the active and inactive wires forming them into a Wheatstone bridge in which the active and inactive wires alternate, an indicating apparatus and source of electrical supply joined to said bridge, means for varying the E. M. F. applied to the bridge, and means independent of the bridge for indicating when a particular value of E. M. F. is obtained.

4. In a catalytic detector, the combination of two active and two inactive wires, connections between the active and inactive wires forming them into a Wheatstone bridge in which the active and inactive wires alternate, an indicating apparatus and source of electrical supply joined to said bridge, means for varying the current supplied to the bridge, a circuit independent of said bridge of equivalent resistance and means for connecting said bridge to the source of supply and the indicating apparatus.

5. In a catalytic detector, the combination of active and inactive wires adjusted in properties and dimensions so that the function, connecting current and resistance is the same for each over a small range of voltage, connections between said wires forming them into a Wheatstone bridge, an indicating apparatus and a source of electrical supply joined to said bridge.

6. In a catalytic detector, the combination of active and inactive wires, said wires being provided with coatings to vary their emissivity or activity, means for connecting said wires into a Wheatstone bridge, an indicating apparatus and source of supply.

7. In a catalytic detector, the combination of a wire of platinum and wire of palladium, a source of electrical supply connected with said wires so as to pass current therethrough, an indicating apparatus connected thereto, said wires being so designed and arranged with reference to the heating effect of the current that the platinum is inactive and the palladium active.

8. In a catalytic detector, the combination of a portable casing having openings for the passage of gas, catalytic wires mounted in said casing, an indicating apparatus, flexible conductors joining said indicating apparatus to said catalytic wires and further flexible conductors connected with said indicating apparatus and adapted for attachment to a source of supply.

9. In a catalytic detector, the combination of a casing having openings for the passage of gas facing in the same direction, means protecting said openings against draft and moisture, and active and inactive wires mounted in said casing symmetrically with respect to said openings.

10. In a catalytic detector, the combination of active and inactive wires, connections joinings said wires into a Wheatstone bridge, a resistance apart from but representing the resistance of the Wheatstone bridge, a source of electric supply, an adjustable resistance, and means for joining either the Wheatstone bridge or the representative resistance across said source in series with said adjustable resistance.

11. In a catalytic detector the combination with a wire of active material, of means for heating said wire to active condition, means for regulating the heating of said wire, and means for determining without heating said wire to active condition when the regulation is in order.

12. In a catalytic detector, the combination of active and inactive wires, connections joining said wires in a Wheatstone bridge, an indicator permanently connected across said bridge, a source of electrical supply, an adjustable resistance permanently connected thereto, a separate resistance, a reducing resistance, means for joining said Wheatstone bridge to the source of supply in series with the adjustable resistance, and means for alternatively joining said separate resistance to the source of supply in series with said adjustable resistance, and for connecting it through said reducing resistance to the indicator.

13. In a catalytic detector, the combination with an active wire of means for supplying gas thereto intermittently, and a chamber about said wire adapted to separate it from the surrounding atmosphere and to furnish it with gas in the intervals of the supply.

In testimony whereof we have signed our names to this specification in the presence of two subscribing witnesses.

ARNOLD PHILIP.

Witnesses:
 A. E. O'DELL,
 LEONARD E. HAYNES.

L. J. STEELE.

Witnesses:
 LAWRENCE DICKEON,
 BERTRAM C. G. SHORE.